Aug. 11, 1964     P. S. GARDNER, JR     3,143,816
UNDERSEA MINING APPARATUS WITH MEANS TO
ESTABLISH A PRESSURE BALANCE ACROSS
THE INLET TO THE CONVEYOR TUBE
Filed Aug. 2, 1962     5 Sheets-Sheet 3

INVENTOR.
PERCY S. GARDNER JR.
BY
ATTYS.

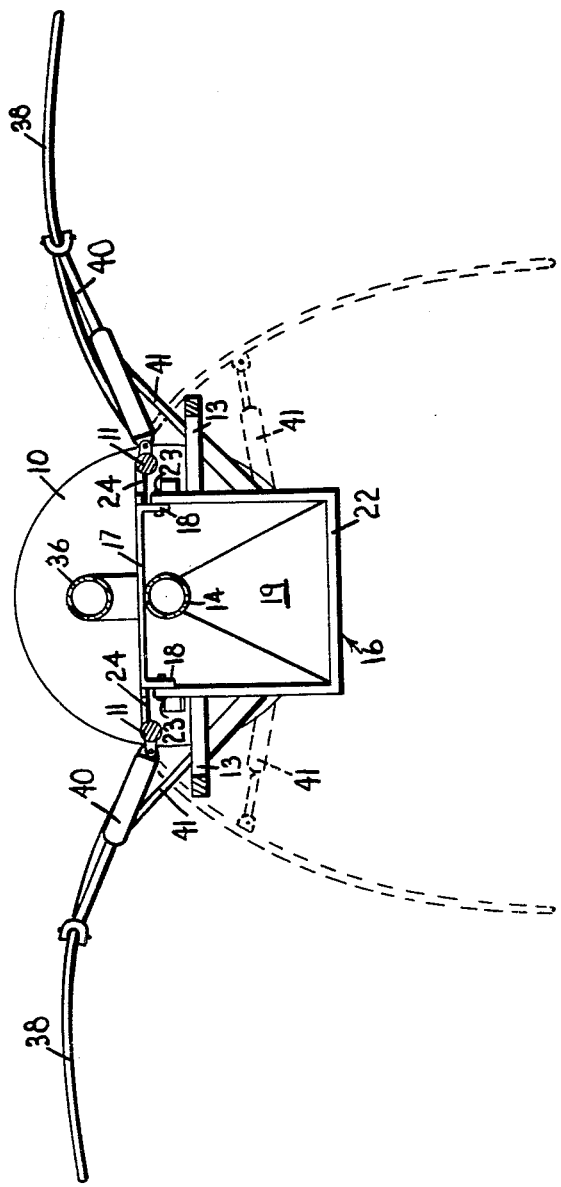

United States Patent Office 3,143,816
Patented Aug. 11, 1964

3,143,816
UNDERSEA MINING APPARATUS WITH MEANS TO ESTABLISH A PRESSURE BALANCE ACROSS THE INLET TO THE CONVEYOR TUBE
Percy S. Gardner, Jr., 3651 Apollo Drive, Salt Lake City, Utah
Filed Aug. 2, 1962, Ser. No. 214,349
6 Claims. (Cl. 37—71)

This invention relates to a novel mining apparatus for use in undersea exploration and mining ventures.

The present invention is concerned with a novel mining apparatus for use in undersea workings and particularly design for use on the ocean floor where deposits of minerals are often found on the floor surface.

The present invention is an improvement utilizing my basic invention covering the hoisting of solid aggregates described in detail in Patent No. 3,003,820, issued October 10, 1961. Basically the hoist described in this patent is a hydraulic hoist comprising an open hopper which feeds material by gravitation to an opening in a vertical tube through which an upwardly directed stream of water is played in hydrostatic balance with liquid in the hopper and maintained at a velocity sufficient to overcome the gravitational forces exerted on the material within the tube. The basic concepts of this hoist will be seen to be exceptionally well adapted to undersea usage.

It is a first object of this invention to provide an undersea mining apparatus utilizing sea water as the hoisting material to convey ore from the sea floor to the water surface or above it. In this manner an inexpensive hoisting medium is utilized having a supply which is inexhaustible.

Another object of this invention is to provide a mining apparatus for use in undersea workings which is entirely remotely controlled and by which foreseeable difficulties can be corrected while the apparatus remains on the ocean floor. One such difficulty is the grasping of particles too large for entry into the conveying tube. This is obviated according to the present invention by hinging the collecting hopper so that such particles can be dumped without damage to the remainder of the apparatus and without surfacing the device for manual servicing.

Another object of this invention is to provide a new combination of mining equipment designed particularly for undersea usage and utilizing components which are now obtainable and well proven.

These and further objects will be evident from a study of the following disclosure taken in conjunction with the accompanying drawings which illustrate one preferred form of my invention. It is to be understood that this form is exemplary and is not intended to limit or restrict the scope of the invention since the various components are subject to a wide degree of change without deviating from my basic purposes. The invention itself is particularly defined in the claims following this disclosure.

In the drawings:

FIGURE 8 is a sectional view taken along line 8—8 in FIGURE 2; and eliminating the shovel arrangements.

Figure 1:
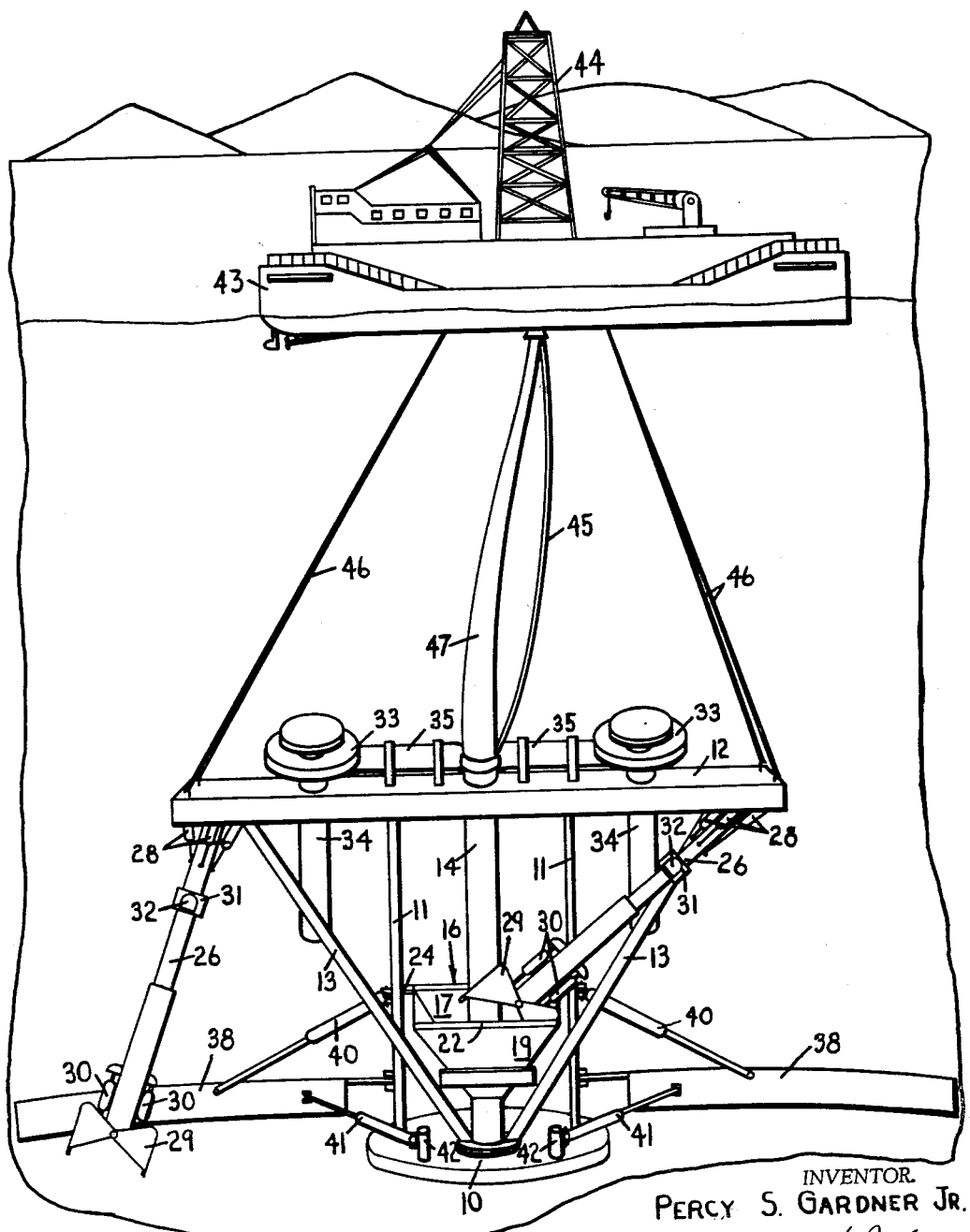
FIGURE 1 is a somewhat diagrammatic view showing the undersea mining aparatus in perspective during operation and illustrating the tender vessel above it.
Figure 2:
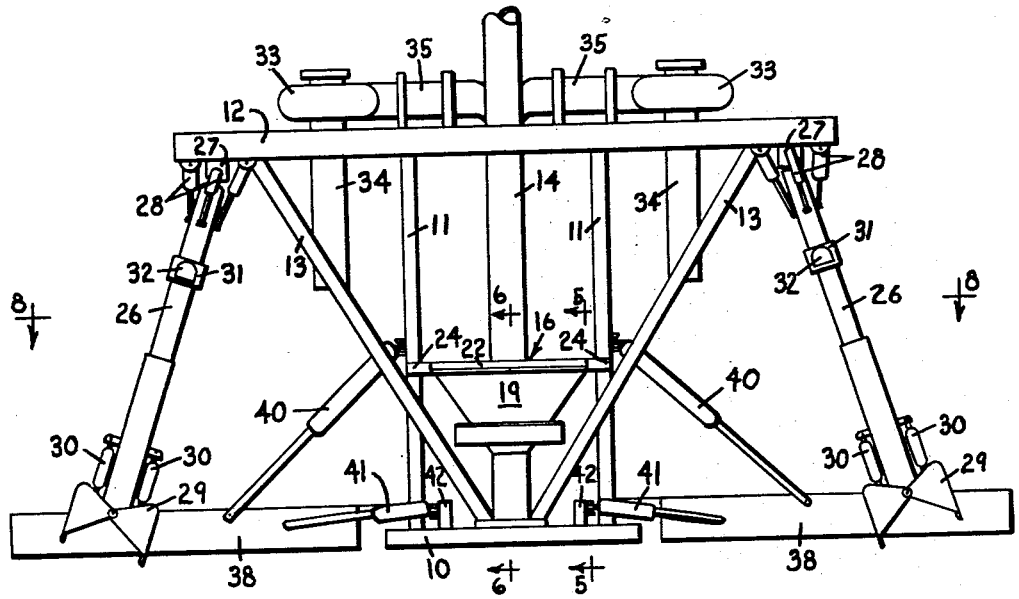
FIGURE 2 is a front view of the apparatus.
Figure 3:
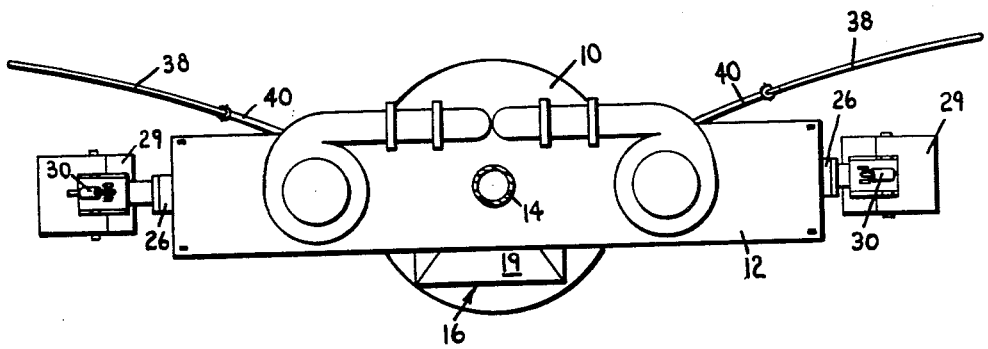
FIGURE 3 is a top view of the apparatus seen in FIGURE 2.
Figure 4:
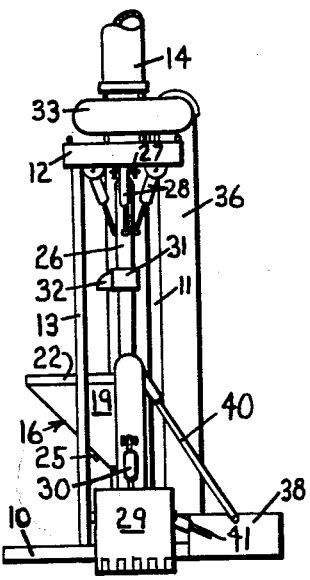
FIGURE 4 is an end view of the apparatus seen in FIGURE 2.

This invention is exemplified by the arrangement illustrated in the drawings which shows an undersea mining apparatus usable in the mining of ore from undersea deposits wherein the ore is found at or near the sea floor. During the following discussion the word "sea" shall be used in its broadest connotation and shall be interpreted to include any body of water, whether inland or ocean, and whether salt water or fresh.

The undersea apparatus includes an upright rigid framework which is supported on a base 10 adapted to rest on the sea floor. The specific configuration of the base 10 may be varied, depending upon the terrain upon which it is to be utilized. In any event, the base 10 must be sufficiently stable so as to maintain the framework in the necessary upright position during the mining operations. The framework also includes uprights 11 extending upwardly from the base 10 and supporting a platform 12 at their upper ends. The platform 12 is preferably parallel to the base 10 and placed directly above it. The platform 12 is further supported by diagonal braces 13. The bracing illustrated in the drawings is exemplary of the main structural features necessary in the framework but may be further strengthened by additional bracing where necessary.

Figure 5:
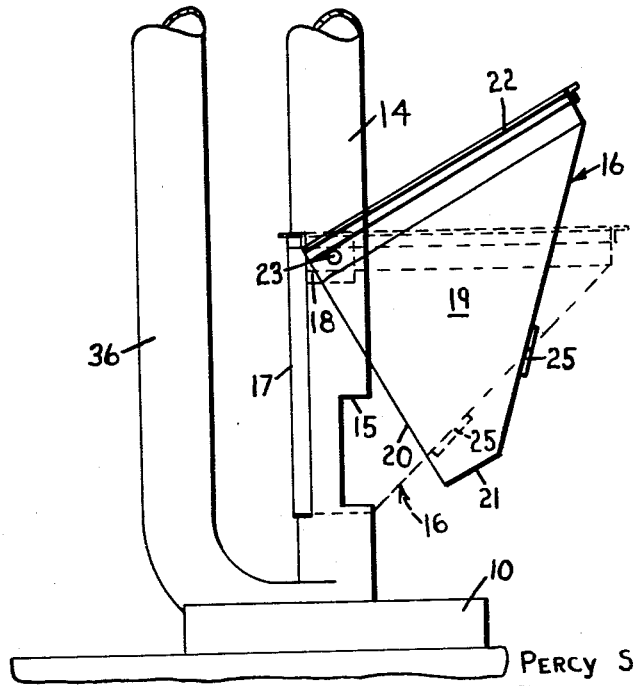
FIGURE 5 is a view taken along line 5—5 in FIGURE 2; showing the hopper in a raised position, the normal position of the hopper being illustrated in dashed lines.
Figure 6:
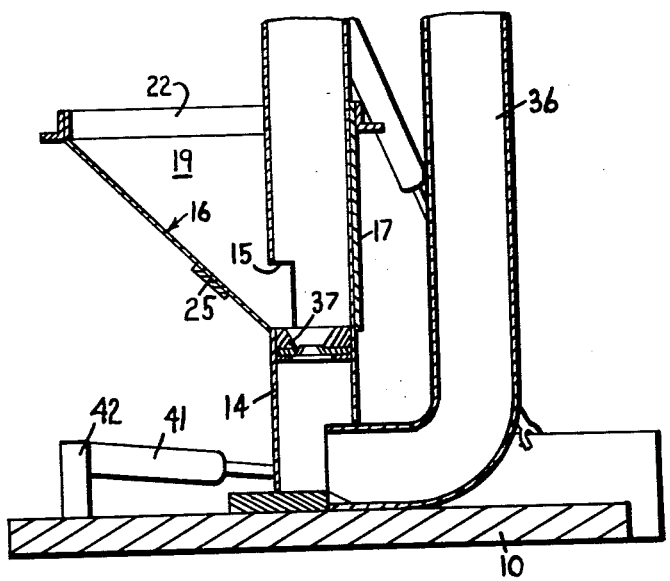
FIGURE 6 is a vertical sectional view taken line 6—6 in FIGURE 2.
Figure 7:
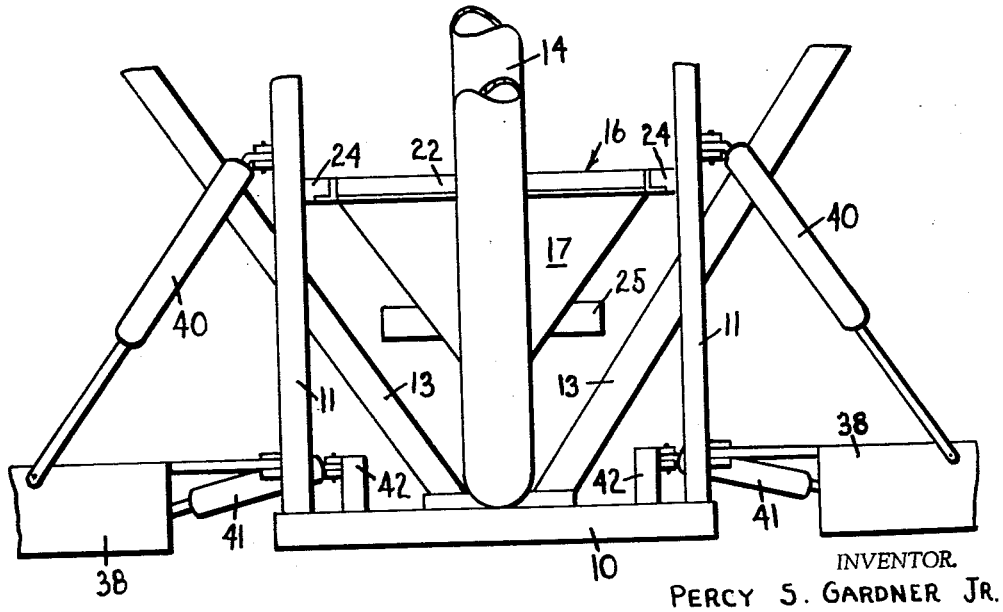
FIGURE 7 is an enlarged rear view of the central portion of the device centered about the hopper.

Mounted on the framework and extending from the base 10 upwardly through the platform 12 is a tube 14. The tube 14 is a hollow cylindrical tube having an inner diameter greater than the normal diameter of the largest ore pieces to be recovered. The tube 14 is provided with a side opening 15, as shown in FIGURES 5 and 6. The opening 15 is a rectangular side aperture cut through the tube walls and may be variable in size as is fully described in my above cited Patent No. 3,003,820. Also carried on the framework is a hopper 16 which is mounted by braces 24 extending to the uprights 11. The hopper 16 surrounds tube 14 and its lower end is directly below the bottom of the opening 15.

More specifically, the hopper 16 includes a vertical wall 17 which is adjacent the tube 14 and which is directly connected to the supporting framework by the braces 24. The vertical wall 17 is provided with perpendicular ears 18 upon which are pivotally mounted the hopper side walls 19. The side walls 19 converge downwardly from a top angle iron brace structure 22 and are provided with side edges 20 adapted to abut the vertical wall 17. The side walls 19 further include a bottom edge 21 adapted to fit against the exterior of the tube 14 immediately below the opening 15. The side walls 19 are preferably mounted on the ears 18 by means of bolts 23. The side walls 19 are further provided with a cross bar 25 projecting outwardly therefrom in order to enable the side walls 19 to be pivotally shifted about the axis of bolts 23 in the manner illustrated in FIGURE 5.

In order to supply ore from the sea floor to the hopper 16 there is shown a pair of extensible shovel arms 26 mounted for movement about perpendicular pivot axes by gimbals 27 located at their upper end and carried on the platform 12. Each extensible shovel arm 26 is provided with hydraulic cylinder assemblies 28, extending from the platform 12 and gimbals 27 to the arm 26 and located circumferentially about arm 26. At the outer end of each arm 26 is a clam shell bucket 29 operable by means of cylinder assemblies 30 connected between the arm 26 and the segments of the bucket 29. The clam shell buckets 29 are adapted to be remotely controlled by operation of the cylinder assemblies 30. In order to provide visual contact with the apparatus a television camera 31 is preferably mounted on each arm 26 and is provided with suitable light 32 so as to facilitate its operation. Additional cameras and lights may be provided as needed.

The arms 26 and buckets 29 are conventional and will not be further described in detail. In operation, each arm can be freely pivoted about its mounting gimbals 27 and may be extended or retracted as desired. The clam shell buckets 29 are capable of grasping a quanity of ore from the sea floor and may dump it in the hopper 16 or wherever may be desired.

The cylinders 28, 40 and 41 may be supplied with operating fluid by auxiliary pump units (not shown) on the platform 12, utilizing sea water as the working fluid medium.

In order to provide the hoisting capacity of this apparatus I have utilized my invention as described in the above mentioned Patent No. 3,003,820. Basically this hoist requires that a stream of liquid be supplied within the tube 14 and across the opening 15 in hydrostatic balance with the liquid in hopper 16 directly outside opening 15. The ore in the hopper 16 must flow through the opening 15 by gravitational forces alone, and is not necessarily aided by any vacuum pressure in the locality of opening 15. This hydrostatic balance is attained by adjustment of the opening 15 where necessary, and by adjustment of the flow of water past the opening 15, and by regulation of the stream itself. It is clear that these various adjustments: (1) position of nozzle with respect to opening; (2) diameter of nozzle with respect to tube 14; (3) rate of flow through a given nozzle size or position, provide a means of obtaining full static balance between the moving carrier liquid at the opening 15 in the tube and the liquid at rest directly outside the opening 15, with the result that solid particles only will enter the pipe opening 15 into the moving stream of liquid. The various particular mechanisms by which this balance is maintained are fully set out in my patent mentioned above and will not be described in further detail herein.

The stream of liquid within tube 14, according to this invention, will be the surrounding sea water. Mounted on the platform 12 are two pumps 33 driven by submersible motors 34. Pumps 33 are conventional centrifugal pumps and the motors 34 are conventional submersible motors. Further details of these devices are not believed necessary. Each pump outlet is connected through a check valve 35 to a common tube 36 which opens in communication with the tube 14 below opening 15. Directly below the opening 15 is a reentrant nozzle 37 utilized to direct the necessary high pressure stream across the opening 15 in such a fashion that the velocity of the water will exceed the free falling velocity of ore within the tube 14 in order that the ore may be carried upwardly along the tube 14. The nozzle 37 may be subject to variable adjustment in position and size as may be found in my detailed description in the above mentioned patent.

In order to further aid the buckets 29 in maintaining a satisfactory supply of ore in the hopper 16, I have provided side scoops 38 which are adapted to be moved along the sea floor as illustrated in FIGURE 8. Each scoop 38 is pivotally mounted on one of the side uprights 11 for motion about a suitable rotational axis. The scoops 38 can be lifted by means of cylinder assemblies 40 connected to the uprights 11. The scoops 38 are dragged along the sea floor by means of cylinders 41 anchored to posts 42 offset from the uprights 11.

The upper end of the tube 14 is connected to a flexible hose 47 which extends upwardly to and/or above the surface of the water. In order to provide a mobile apparatus, it is intended that the mining apparatus be suspended below a tender 43 having an open central area within which the framework and its supporting mechanism may be hoisted for servicing and transportation. The tender 43, illustrated in FIGURE 1, would be provided with a suitable derrick 44 having pulley mechanisms and winches necessary to lift and lower the framework and the devices carried thereon. During the mining operation, all ore must be filtered from the sea water as it is discharged. The apparatus is shown with electrical and hydraulic control cables 45 extending downwardly from the tender 43 and with suspension cables 46 connected to the platform 12. Cables 46 are utilized to lift and lower the entire mining apparatus when desired.

In operation, the present invention provides a continuous mining apparatus usable at any practical depth for delivering material from the sea floor to barges, ore boats or other conveyances lying alongside or in vicinity of the tender. The device may be transported in tender ship 43 and may be lowered where previous explorations have indicated that ore may be found on or near the sea floor. After the apparatus has been lowered it may be moved by manipulation of the cables 46 and by utilizing the buckets 29 as legs to walk along the sea floor. During such an operation the scoops 38 can be lifted by means of the cylinder assemblies 40. When located on the sea floor the pumps 33 are operated by means of motors 34 to supply the necessary stream of water through the tube 14. The scoops 38 are operated, as illustrated in FIGURE 8, to bring ore to the buckets 29 which in turn pick up the ore and dump it within the hopper 16, as shown in FIGURE 1. The ore flows down the hopper walls 19 by gravity and once within the tube 14, the ore is then carried upwardly to the tender 43. The various operating cylinders or electrical devices used to control the moving portions of this appartus as well as the motors 34 and any auxiliary pumps, can all be located on the tender 43 for remote control therefrom. Since such controls are well known and within the skill of one in this field, they have not been illustrated in detail.

One common problem in the operation of this device is the possibility that chunks of ore will be placed in hopper 16 that are too large to fit through the opening 15. If corrective measures are not taken, this would disable the entire operation and require surface maintenance by the supervising tender 43. For this purpose, the hopper sides 19 are hinged at 23 and the cross bar 25 is provided so that a bucket 29 can engage it and push sides 19 outwardly and upwardly to dump the contents of hopper 16. In this manner, operation of the apparatus can continue without interruption until the ore at a particular area has been depleted.

Thus I have described a novel mining apparatus for undersea workings which requires no manual control at the site and which does not rely upon a mechanical connection between the mining device and a tending vessel or derrick. The device is mobile and can be used at any practical working depth. Many modifications will be obvious to a person skilled in this field, such as other digging devices that might be substituted in place of the buckets 29. For these reasons it is not intended that the above description should limit or restrict my invention except as it is defined in the claims which follow.

Having thus described my invention, I claim:

1. An undersea mining apparatus comprising:
   a supporting framework having a base adapted to rest upon the sea floor;
   a conveyor tube having a lower portion fixed to said framework and extending upwardly therefrom to the water surface, said tube being provided with a side opening located adjacent said framework, said tube being of substantially constant cross section upwardly adjacent to said opening;
   a hopper mounted on said framework adjacent said tube, said hopper having converging sides leading to the opening of said tube;
   means on said framework adapted to transfer material from the sea bottom to the hopper;
   and means on said framework operatively connected to said tube for maintaining a stream of sea water across said opening in hydrostatic balance with the water outside of said opening, said stream of sea water having sufficient velocity to counteract gravitational forces on material within the tube and to carry such material to the water surface.

2. The device as defined in claim 1 wherein a portion of said hopper is pivotally mounted on said framework for motion relative thereto about an axis whereby material in said hopper may be dumped externally of said tube.

3. The device as defined in claim 1 further comprising: scoop means mounted on said framework and extending along the ocean floor beyond the base of said framework;

and means operatively connected between said framework and said scoop means adapted to drag said scoop means along the ocean floor to thereby collect ore in the vicinity of said framework.

4. An undersea mining apparatus comprising:

a rigid upstanding framework having a base adapted to rest upon the sea floor;

a conveyor tube having an inlet portion fixed to said framework and extending upwardly substantially to the surface of the sea from a location adjacent the base of said framework, said tube being provided with an opening along a portion of its circumference located adjacent its lower end and being of substantially constant cross section upwardly adjacent to said opening;

a hopper mounted on said framework adjacent said tube, said hopper having an open top end and downwardly converging sides terminating at the tube wall directly below said opening;

movable shovel means mounted on said framework adapted to transfer material from the sea bottom to the interior of said hopper;

and pump means mounted on said framework operatively connected to the lower end of said tube for maintaining a longitudinally directed stream of sea water across the tube opening in hydrostatic balance with water outside of said opening within said hopper, said stream of sea water having sufficient velocity to counteract gravitational forces on material within the tube and to carry such material to the surface of the sea.

5. The device as defined in claim 4 wherein said movable shovel means comprise two extensible leg portions extending downwardly from said framework engageable with the sea floor as legs with the base between them, and means to move said leg portions angularly for advancing the apparatus along the sea floor.

6. An undersea mining apparatus comprising:

a rigid upstanding framework having a base adapted to rest upon the sea floor;

an upright tube fixed to said framework and extending upwardly to and/or above the water surface from location adjacent the base of said framework, said tube being provided with a side opening located adjacent its lower end and being of substantially constant cross section upwardly adjacent to said side opening ;

a hopper mounted on said framework comprising a wall fixed relative to said tube and adjacent thereto, and downwardly converging side walls extending outwardly from said wall including side edges adapted to abut said wall and a bottom edge adapted to abut said tube immediately below said tube opening, said side walls being pivotally carried relative to said wall for movement about an axis to said wall;

means on said framework adapted to transfer material from the sea bottom to the hopper;

and means on said framework operatively connected to said tube for maintaining a stream of sea water across said opening in hydrostatic balance with the water outside of said opening and having sufficient velocity to counteract gravitational forces on material within the tube and to carry such material to or above the water surface.

References Cited in the file of this patent

UNITED STATES PATENTS

| | | |
|---|---|---|
| 496,342 | Collins | Apr. 25, 1893 |
| 3,003,820 | Gardner | Oct. 10, 1961 |
| 3,010,232 | Skakel | Nov. 28, 1961 |